United States Patent
Hellenbrand et al.

(10) Patent No.: US 10,294,027 B2
(45) Date of Patent: May 21, 2019

(54) OPERATING DEVICE FOR AN ORDER-PICKING APPARATUS

(71) Applicant: CareFusion Germany 326 GmbH, Kelberg (DE)

(72) Inventors: Christoph Hellenbrand, Kaifenheim (DE); Dietmar Gross, Kelberg (DE)

(73) Assignee: CAREFUSION GERMANY 326 GMBH, Kelberg (DE)

( * ) Notice: Subject to any disclaimer, the term of this patent is extended or adjusted under 35 U.S.C. 154(b) by 162 days.

(21) Appl. No.: 14/593,760

(22) Filed: Jan. 9, 2015

(65) Prior Publication Data

US 2016/0200513 A1 Jul. 14, 2016

(51) Int. Cl.
| | |
|---|---|
| B65G 1/06 | (2006.01) |
| B65G 1/04 | (2006.01) |
| B65G 1/137 | (2006.01) |
| G07F 17/00 | (2006.01) |

(52) U.S. Cl.
CPC .......... *B65G 1/06* (2013.01); *B65G 1/0414* (2013.01); *B65G 1/0435* (2013.01); *B65G 1/1376* (2013.01); *G07F 17/0092* (2013.01)

(58) Field of Classification Search
CPC .......... B65G 1/0435; B65G 1/06; B66F 9/183
USPC ....................................................... 414/280
See application file for complete search history.

(56) References Cited

U.S. PATENT DOCUMENTS

| | | | | |
|---|---|---|---|---|
| 2,674,387 A | * | 4/1954 | Ehmann ................. | B66F 9/183 294/87.26 |
| 2,956,700 A | * | 10/1960 | Quayle ................... | B66F 9/183 294/99.1 |
| 3,971,585 A | * | 7/1976 | LaBudde ................ | B66F 9/183 294/119.1 |
| 6,234,550 B1 | * | 5/2001 | Stoltenhoff ........... | B65G 1/0435 294/119.1 |

(Continued)

FOREIGN PATENT DOCUMENTS

| | | | | |
|---|---|---|---|---|
| DE | 298 17 529 U1 | | 3/2000 | |
| DE | 10204513 A1 | * | 8/2003 | ............. B66F 9/183 |

(Continued)

OTHER PUBLICATIONS

Search Report from corresponding EP Appln. No. 15150568.2 dated Jul. 1, 2015 (7 pages).

(Continued)

*Primary Examiner* — James Keenan
(74) *Attorney, Agent, or Firm* — Morgan, Lewis & Bockius LLP (57) ABSTRACT

An operating device for an order-picking apparatus, the operating device having a delivery table with two opposite slotting and picking sides and two longitudinal sides. A transport channel for accommodating picked items extends between the slotting and picking sides along a first horizontal direction. Two clamping jaws define a lateral delimitation of the transport channel. A pusher device having a drive for moving a section of the pusher device along the first horizontal direction has a driver coupled with the drive, so (Continued)

the driver is movable into and out of the transport channel. The driver is also movable in the transport channel along the first horizontal direction so that the picked items are movable out of the transport channel by way of a slotting and picking side.

19 Claims, 8 Drawing Sheets

(56) References Cited

U.S. PATENT DOCUMENTS

| | | | | |
|---|---|---|---|---|
| 6,923,612 B2* | 8/2005 | Hansl | ................. | B66F 9/07 414/277 |
| 8,790,061 B2* | 7/2014 | Yamashita | ........... | B65G 1/0492 414/280 |
| 8,956,099 B2* | 2/2015 | Olszak | ................ | B66F 9/07 414/277 |
| 9,975,698 B2* | 5/2018 | Hellenbrand | ............ | B65G 1/06 |
| 2006/0245862 A1* | 11/2006 | Hansl | ............ | B65G 1/0435 414/281 |
| 2009/0196720 A1* | 8/2009 | Kostmann | ............ | B65G 1/0435 414/331.01 |
| 2010/0290874 A1* | 11/2010 | Wolkerstorfer | ...... | B65G 1/0435 414/280 |
| 2015/0104278 A1* | 4/2015 | Von Liechtenstein | ....................... | B65G 1/0435 414/277 |
| 2016/0075511 A1* | 3/2016 | Poulin | ................. | B65G 1/0435 414/331.08 |

FOREIGN PATENT DOCUMENTS

| | | | |
|---|---|---|---|
| EP | 2 433 882 A1 | 3/2012 | |
| EP | 2 522 599 A1 | 11/2012 | |
| EP | 2 581 328 A1 | 4/2013 | |
| WO | WO 2009/000302 A1 * | 12/2008 | ........... B65G 1/0435 |
| WO | WO 2009/079678 A1 | 7/2009 | |
| WO | WO 2009/098573 A1 | 8/2009 | |

OTHER PUBLICATIONS

International Preliminary Report and Patentability (IPRP) dated Jul. 20, 2017 in PCT/EP2016/050195 (8 pages).

* cited by examiner

OPERATING DEVICE FOR AN ORDER-PICKING APPARATUS

BACKGROUND

The disclosed embodiments relate to an operating device for an order-picking apparatus and in particular to an operating device for an order-picking apparatus having storage locations disposed opposite one another.

In many medical treatment settings, it is desirable to provide an operating device for order-picking apparatuses for automatic slotting and picking of individual items, particularly medication packages. For example, an operating device that is able to slot individual items into storage locations in types of storage oriented in different ways, by way of opposite face sides, and to remove such items from such locations.

SUMMARY

The disclosed embodiments provide an operating device for an order-picking apparatus having storage locations disposed opposite one another. The operating device preferably includes a delivery table having two opposite slotting and picking sides and two longitudinal sides, wherein a transport channel configured to accommodate at least one individual item extends between the slotting and picking sides along a first horizontal direction. The operating device also preferably includes two elongated clamping jaws disposed above the delivery table, the elongated clamping jaws having planar clamping surfaces that face one another, the surfaces defining a lateral delimitation of the transport channel in at least one or more sections, wherein the elongated clamping jaws are coupled with a first drive unit and are configured to be movable jointly along the first horizontal direction, and wherein the elongated clamping jaws are coupled with a second drive unit and configured to be movable along a second horizontal direction transverse to the first horizontal direction, in one of a direction toward one another and away from one another, so that at least one individual item is configured to be holdable between the clamping surfaces and movable along the first horizontal direction. The operating device further includes at least one pusher device comprising a first drive for moving a section of the pusher device along the first horizontal direction, wherein the pusher device has a first driver coupled with the drive, the first driver configured to be movable at least partially into the transport channel and removable from the transport channel, and wherein the first driver is configured to be movable in the transport channel, along the first horizontal direction, so that the at least one individual item is movable out of the transport channel by one of the slotting and picking sides in at least one or more sections of the transport channel.

The disclosed embodiments also provide an order-picking apparatus that includes a plurality of storage locations disposed opposite one another. The order-picking apparatus also includes an operating device having a delivery table having two opposite slotting and picking sides and two longitudinal sides, wherein a transport channel for accommodating at least one individual item extends between the slotting and picking sides along a first horizontal direction. The operating device further includes a plurality of clamping jaws disposed above the delivery table, the clamping jaws each having planar clamping surfaces, the clamping surfaces of one clamping jaw configured to face the clamping surfaces of at least one other clamping jaw, the surfaces defining a lateral delimitation of the transport channel in at least one or more sections, wherein the clamping jaws are coupled with a first drive unit and are configured to be movable jointly along the first horizontal direction, and wherein the clamping jaws are coupled with a second drive unit and configured to be movable along a second horizontal direction transverse to the first horizontal direction, wherein the clamping surfaces are configured to hold and move at least one individual item in the first horizontal direction. The operating device also includes at least one pusher device comprising a first drive for moving a section of the pusher device along the first horizontal direction, wherein the pusher device has a first driver coupled with the drive, the first driver configured to be movable at least partially into the transport channel and at least partially out of the transport channel, and wherein the first driver is configured to be movable along the first horizontal direction in the transport channel, wherein in at least one or more sections of the transport channel one of the slotting and picking sides is configured to move at least one individual item out of the transport channel.

The disclosed embodiments also provide a method for picking and slotting individual items from a plurality of storage locations disposed opposite one another. The method includes storing individual items in shelf units having storage locations disposed opposite one another. The method further includes picking, by two or more clamping jaws, an individual item from a storage location on one slotting and picking side of a delivery table. The method also includes pulling, by the clamping jaws, the picked item from the storage location onto the delivery table. The method further includes pushing, by a driver of a pushing device within a transport channel, the picked item to a delivery position on the delivery table. The method also includes pushing, by the driver of the pushing device within the transport channel, the picked item off of the delivery table to one of a storage location or a delivery channel.

The foregoing and other features, aspects and advantages of the disclosed embodiments will become more apparent from the following detailed description and accompanying drawings.

DETAILED DESCRIPTION

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

Within the scope of this application, the term "individual item" is regularly used, with this formulation intended to also include the plural. For example, in using the operating device an individual item or a plurality of individual items may be simultaneously slotted and picked.

An operating device for slotting and picking of block-shaped small individual items (e.g., medication packages) is typically configured so that individual items can be picked from storage locations on horizontal, long shelves and stored on them. The shelves, together with shelf walls disposed at specific intervals, form a shelf unit having a plurality of storage locations. Multiple storage locations disposed one behind the other and/or next to one another form a virtual shelf compartment.

To pick an individual item from a predetermined storage location, the typical operating device is moved in the vertical and horizontal direction, in front of the front side of the shelf compartment having the corresponding storage location, and positioned in front of the shelf with its face side. As soon as the operating device has been positioned, clamping jaws are moved into the shelf compartment and then moved toward one another, so that the individual item is clamped between the clamping jaws. The clamping jaws, with the individual item clamped between them, are then moved back out of the shelf compartment, with the individual item being pulled onto a delivery table of the operating device. If multiple individual items disposed one behind the other in a shelf compartment are supposed to be picked from multiple storage locations, the clamping jaws must be moved further into the shelf compartment, accordingly, with picking of multiple individual items making certain demands on the dimensions and placement in the shelf compartment of the individual items to be picked.

For slotting of an individual item in a specific storage location, the individual item is first brought onto the delivery table of the operating device, and the operating device is subsequently moved to the shelf compartment having the desired storage location. The clamping jaws can be moved, just before actual picking takes place, in such a manner that they almost lie against the sides of the individual item to be picked. In this manner, the clamping jaws can be a guide for the individual item available.

A pusher may be disposed opposite the face side of the operating device assigned to the shelf is then moved out to push the individual item, if desired with simultaneous guidance by means of the clamping jaws, onto the shelf and to the desired storage location. Because of the placement of the pusher on one face side of the operating device, slotting and picking are only possible by way of the "other" face side (i.e., slotting and picking take place on the same face side). If an individual item is supposed to be picked from a first shelf and placed onto an opposite, second shelf, it often requires that the operating device be rotated about the vertical axis by 180° after picking from the first shelf, so that the slotting and picking side faces the second shelf. Further, the typical operating device is only suitable for picking individual items from storage locations situated on horizontal shelves, or slotting them onto such locations.

Accordingly, an operating device is provided for an order-picking apparatus having storage locations disposed opposite one another. The operating device may have a delivery table having two opposite slotting and picking sides and two longitudinal sides, with a transport channel for accommodation of at least one individual item extending between the slotting and picking sides, along a first horizontal direction.

The delivery table of the operating device may be configured such that individual items can get to the delivery table by way of one slotting and picking side, and can be brought from the delivery table to a storage location by way of either the opposite or the same slotting and picking side. The transport channel that extends along the first horizontal direction does not represent a structural characteristic of the operating device itself, but rather is defined by parts of the operating device and defines a transport path between the slotting and picking sides, along which individual items can be moved. In this connection, the formulation "along the first horizontal direction" should be interpreted to mean that the individual items can be moved in this direction and counter to this direction.

The operating device may include two elongated clamping jaws disposed above the delivery table, having facing, planar clamping surfaces, which define a lateral delimitation of the transport channel at least in certain sections. The clamping jaws may be coupled with a drive unit, in order to be moved jointly along the first horizontal direction, and may be coupled with a second drive unit, in order to be moved along a second horizontal direction transverse to the first horizontal direction, toward and away from one another, so that at least one individual item may be held between the clamping surfaces and moved along the first horizontal direction.

The operating device may include at least one pusher device having a drive for moving a section of the pusher device along the first horizontal direction, with the pusher device having a driver coupled with the drive. The driver is configured to be introduced into the transport channel and removed from it, at least in part. The drive is also configured to be moved along the first horizontal direction in the transport channel, above the delivery table, in such a manner that the at least one individual item can be moved out of the transport channel by way of a slotting and picking side, at least in certain sections. The driver is also configured to be removed from the transport channel again so that transport over the complete length of the channel, from the one slotting and picking side to the other, may occur.

The operating device may include two modules for moving individual items. For example, the elongated clamping jaws may be disposed above the delivery table, with their related drive units. Individual items may be picked from vertical storage locations by the elongated clamping jaws, which may have a supporting action when picking from vertical storage locations.

As another example, the pusher device may push individual items from the delivery table to a storage location. Here, it is not necessary that the storage location is configured on a horizontal shelf. For example, the storage location may also be situated in an inclined shaft. For slotting into an inclined shaft descending from the delivery table, the individual item may be pushed into the shaft beyond the slotting and picking side situated at the face side of the shaft. The individual item may slide downward in the shaft under the effect of gravity until it reaches a stop, which may be provided by another individual item or a release mechanism at the end of the shaft.

The driver of the pusher device may be introduced into the transport channel and removed from it again, so that the driver does not permanently remain in the transport channel and therefore free movement of an individual item from one slotting and picking side to the opposite slotting and picking side is not blocked.

Therefore, it is possible to pull an individual item, using the clamping jaws, onto the delivery table from a horizontal storage location situated on one slotting and picking side, to introduce the driver of the pusher device into the transport channel in the region of this slotting and picking side, "behind" the individual item, and to push the individual item to the opposite slotting and picking side, using the driver that can be moved in the transport channel above the delivery table, and to pick the individual item by way of the opposite slotting and picking side (e.g., into a shaft or onto a horizontal shelf).

The configuration of the operating device may make it possible to slot and pick individual items from opposite storage locations, without rotation of the operating device about the vertical axis being necessary. Here, the opposite storage locations do not have to belong to the same "types of storage" (shaft system and level shelves).

The operating device provides for transfer of individual items more rapidly in the order-picking apparatus, from a storage location A to a storage location B, because the rotation about the vertical axis is eliminated. Further, the rows of shelving disposed opposite one another may stand closer to one another, because rotation about the vertical axis is no longer necessary.

The driver of the pusher device may be moved along the first horizontal direction above the delivery table and above or below the elongated clamping jaws. Accordingly, the driver may be introduced into the transport channel and removed from it again, from the side. For this purpose, however, it is necessary that the pusher device with all its components for movement of the driver is disposed on a longitudinal side of the operating device. However, because the components for movement of the clamping jaws are also usually disposed on the longitudinal sides of the operating device, such aggregation of components on one longitudinal side is complicated, in terms of design.

In a preferred embodiment, it is therefore provided that the delivery table has a recess that extends along the first horizontal direction, from which recess the driver may be introduced into the transport channel, at least in part, and in which the driver may be moved along the first horizontal direction. Therefore the components of the pusher device are not disposed on a longitudinal side of the operating device, but rather in a recess of the delivery table, so that no concentration of the components on one longitudinal side of the operating device is necessary. In such a case, the driver is coupled with the drive in such a manner that the driver may be moved above the plane of the delivery table, the driver may be moved in the first horizontal direction above the plane of the delivery table (for pushing an individual item), and the driver may also be brought back down below the plane of the delivery table.

In order for the driver to be able to push individual items on the delivery table from and to the two slotting and picking sides, it is necessary that the driver may be introduced into the channel on both slotting and picking sides and removed from it again. This requires a complicated structure of the pusher device, in terms of design. In a preferred embodiment, it is therefore provided that the operating device has a second pusher device having a drive and a driver, where the drivers of the first and of the second pusher device may be introduced into the transport channel, at least in part, from the recess, separately from one another, and may be moved in this channel along the first horizontal direction. Here, the two pusher devices are coordinated with one another in such a manner that individual items may be moved in opposite directions with them.

The operating device may be configured in such a manner that it may slot individual items into storage locations having different structures, and pick such items from such locations. In the case of inclined storage locations, which are configured to descend from an adjacent slotting and picking side, the individual items usually slide downward to a stop, under the effect of gravity. When using very small individual items, however, it may happen that the center of gravity of the individual item is still situated above the delivery table when a driver has been completely moved to one slotting and picking side. In order to allow the individual item to be moved above a slotting and picking side in such a manner that the center of gravity is situated beyond the slotting and picking side (e.g., already above the storage location), it is provided, in the case of a preferred embodiment, that a driver has a projection that may be moved beyond a picking and slotting side.

The projections of the drivers may be configured in such a manner that they may be moved beyond the picking and slotting sides. Individual items may be pushed completely off the delivery table onto a storage location. With a correspondingly configured operating device, it is also possible to push individual items into an ascending shaft. For this purpose, the individual items are first pushed completely into the shaft, in which they are held with the projection. Then the channel may be closed by means of a suitable closure device, which is adapted to the configuration of the projection, and the driver may be moved back. The individual item is then held in the channel by the closure device. In order to prevent the individual item from becoming wedged as it is "pushed up," the clamping jaws may be used in a supporting manner.

In a preferred embodiment of the operating device, the pusher device has a guide device having a guide that extends along the first horizontal direction (x), along which the driver may be moved through the transport channel. The guide device may also have a section that extends away from the delivery table, at least in one end region, by way of which section the driver may be moved out of the transport channel. The guide device, in combination with the recess in the delivery table, may be disposed underneath the delivery table or on a longitudinal side of the delivery table, for example.

The use of a correspondingly configured guide underneath the delivery table provides for removing the driver from the transport channel in a position with reference to the delivery table. For this purpose, the guide for the driver is guided away from the delivery table in this region (e.g., either downward or to the side), so that when the driver is guided into this region, the driver itself is removed from the transport channel.

For picking of individual items from a horizontal storage location, the clamping jaws are pushed between two shelves or into a shelf compartment beyond a slotting and picking side of the delivery table. For this purpose, many of the components that control the movement of the clamping jaws are moved along the longitudinal sides of the delivery table. In order to achieve a particularly compact construction, it is provided in a preferred embodiment of the operating device that the first drive unit and the second drive unit are disposed in a U-shaped drive component that spans the transport channel and is guided on or below the two longitudinal sides of the delivery table.

The operating device may provide for slotting and picking not just one individual item, but rather multiple individual items at the same time. In order to simplify the transport of the individual items on the delivery table, it is provided, in a preferred embodiment, that the delivery table has a coating having low adhesion friction, at least in certain sections of the delivery table. In order to ensure that the clamping jaws lie against the individual items with a particularly large surface area in their clamping region, it is provided, in a preferred embodiment, that the clamping jaws are formed, at least in certain sections, from a resilient material. Furthermore, it is preferred that the clamping surfaces of the clamping jaws have a coating having great adhesion friction, in order to thereby prevent the clamping surfaces from slipping off the lateral surfaces of the individual items to be picked, particularly when picking a plurality of individual items.

Figure 1:
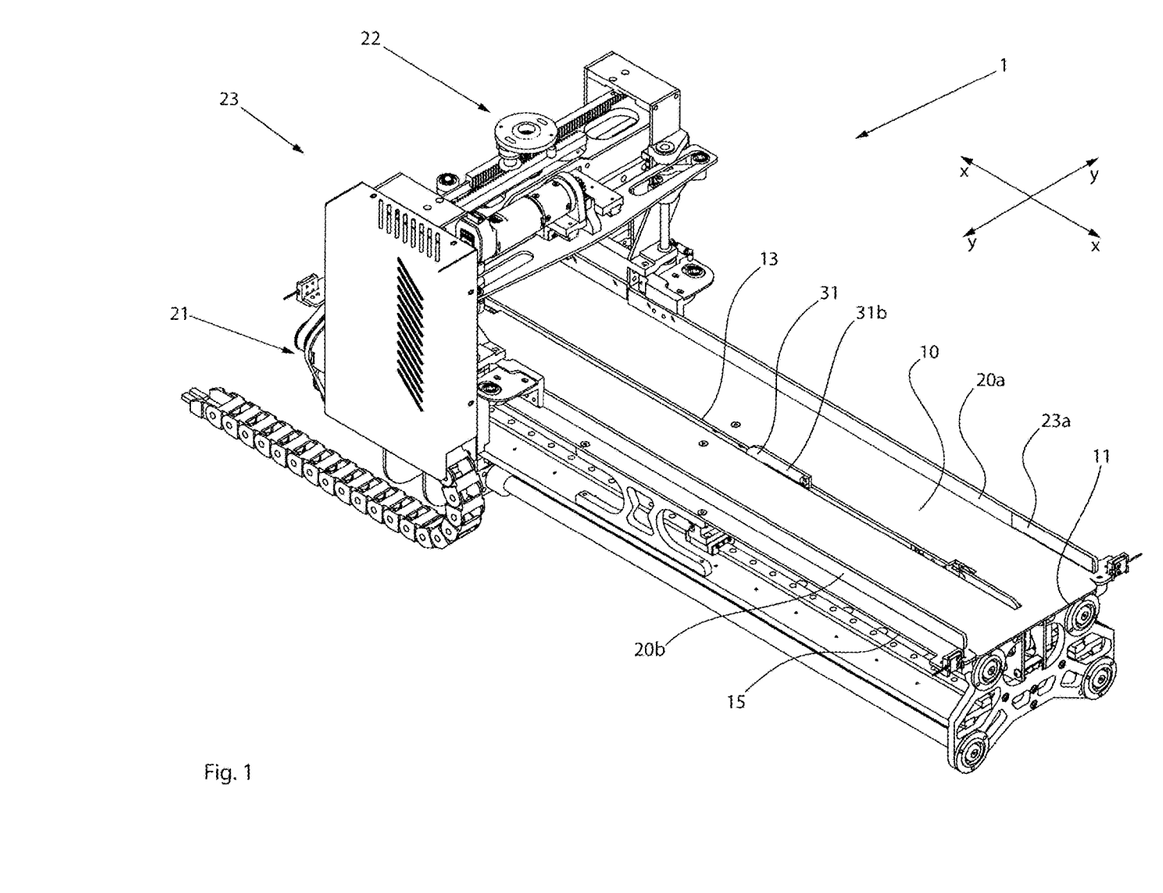
FIG. 1 is a perspective view of an embodiment of an operating device.
Figure 2:
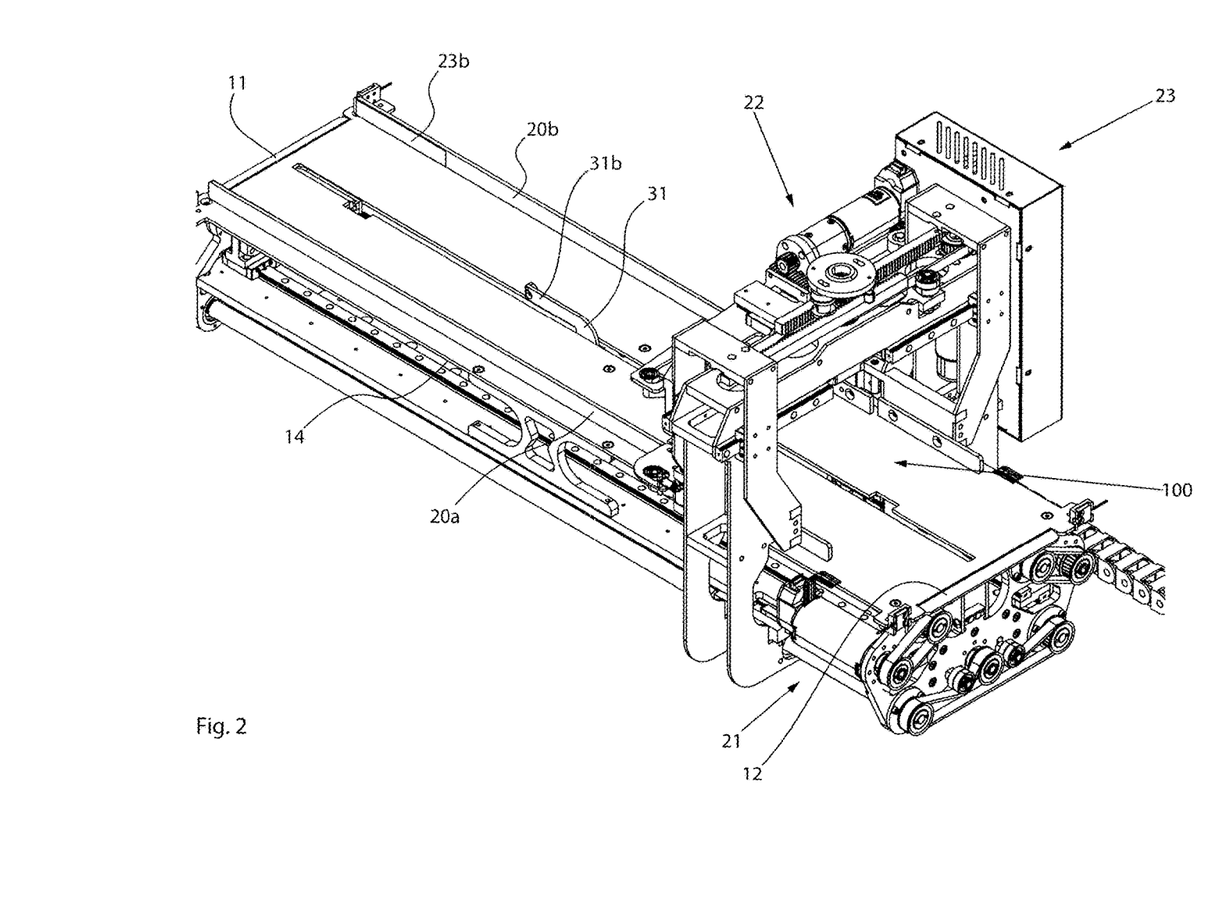
FIG. 2 is another perspective view of the operating device of FIG. 1.

FIGS. 1 and 2 show perspective views of an embodiment of an operating device 1 comprising an elongated delivery table 10 having two opposite slotting and picking sides 11, 12 and two opposite longitudinal sides 14, 15. In the embodiment shown, the delivery table 10 is therefore configured to be rectangular, but other sizes and shapes are contemplated. A transport channel 100 extends between the slotting and picking sides 11, 12, along a first horizontal direction x (see FIG. 2), for accommodation and transport of individual items 50 (see FIGS. 7A and 7B). The transport channel 100 is not a physical component of the operating device according to the invention, but rather it is a free space defined by the components of the operating device 1, in which and through which the individual items 50 may be moved.

Figure 3:
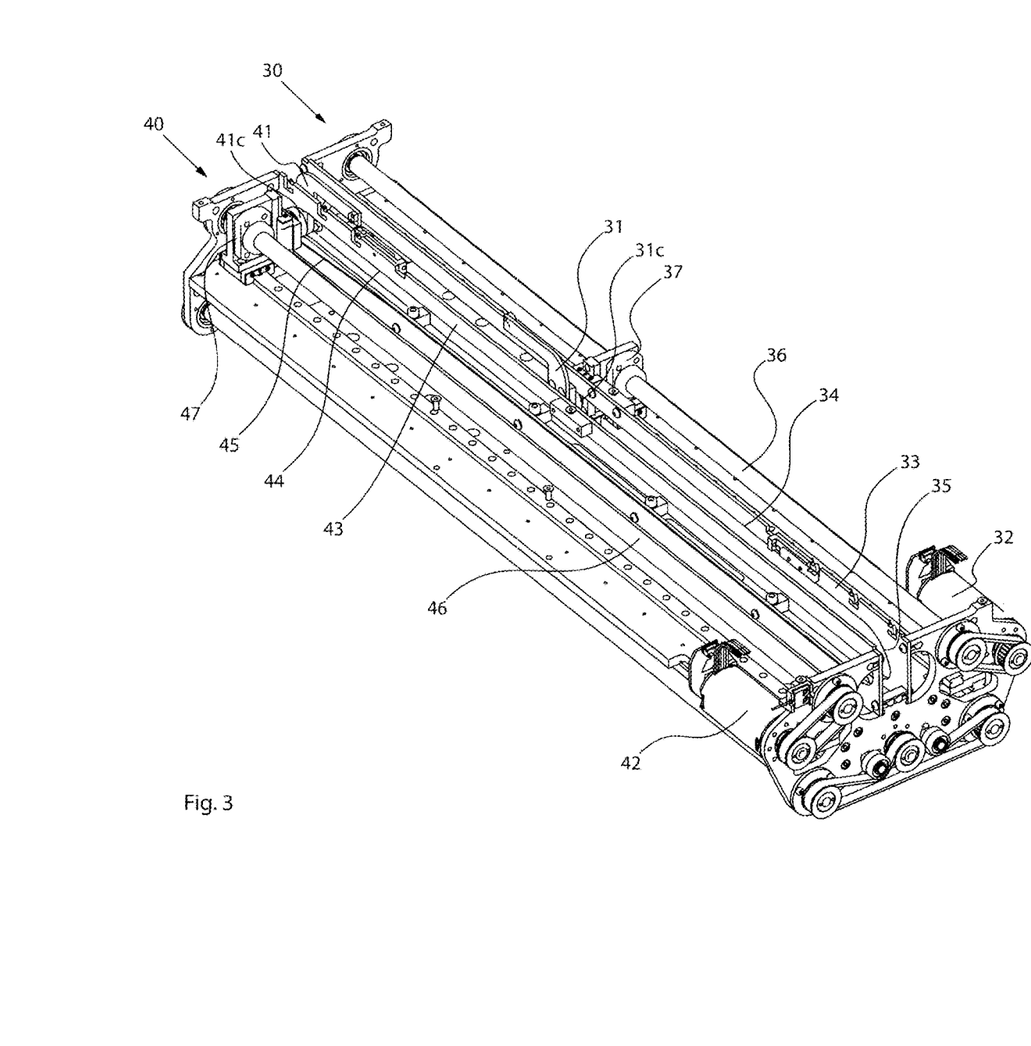
FIG. 3 is a perspective view of an embodiment of components disposed underneath a delivery table.

In the embodiment shown, the delivery table 10 comprises a recess 13 that extends along a first horizontal direction x, in which recess 13 a driver 31 having a projection 31b is guided. The driver 31 is part of a pusher device 30, as shown in FIG. 3. However, as shown in FIGS. 1 and 2, the driver 31 may be moved in the recess 13 along the first horizontal direction x.

In the embodiment shown, the delivery table 10 is spanned by a U-shaped drive component 23, which comprises a first drive unit 21 and a second drive unit 22. Using the first drive unit 21, the U-shaped drive component 23 may be moved along the longitudinal sides 14, 15 of the delivery table 10. The drive component 23 carries two clamping jaws 20a, 20b, which are disposed parallel to one another on the longitudinal sides 14, 15 of the delivery table 10, in the views according to FIGS. 1 and 2. The clamping jaws 20a, 20b are fixed in place on the drive component 23 so as to pivot, and can be pivoted, by way of the second drive unit 22, in a second horizontal direction y, which lies orthogonal to the first horizontal direction x, specifically in such a manner that the tops of the clamping jaws 20a, 20b may be moved toward one another and away from one another. Using such a movement, individual items 50 that are disposed on a vertical shelf (not shown) may be pulled from the vertical shelf onto the delivery table 10 after the tips of the clamping jaws 20a, 20b have been moved toward one another. In such a case, the driver 31 may be moved completely below the plane of the delivery table 10 so that the driver 31 is removed from the transport channel 100.

In the embodiment shown, the clamping surfaces of the clamping jaws 20a, 20b have a coating 23a, 23b having great adhesion friction on their clamping end sections. At their opposite end sections, the clamping jaws 20a, 20b are fixed in place on the drive component 23, but this is not essential for the present disclosure. The operating device 1 may have four clamping jaws, for example, which may be disposed on opposite sides of the drive component 23, so as to pivot, providing for individual items to be picked from horizontal storage locations on both slotting and picking sides 11, 12. Further, the clamping jaws themselves, instead of the drive component on which they are attached, may be movable so that two clamping jaws are configured for picking individual items from horizontal storage locations on both slotting and picking sides 11, 12 of the operating device. The drive units for the clamping jaws would then have to be adapted accordingly.

FIG. 3 shows a perspective view of components of the operating device disposed underneath the delivery table 10. In the embodiment shown, two pusher devices 30, 40 are disposed underneath the delivery table 10. Pusher devices 30, 40 are responsible for movement of drivers 31, 32 into and out of the transport channel 100 and within the transport channel 100, along the first horizontal direction x. For this purpose, the delivery table 10 may comprise a corresponding recess 13 (see FIG. 1), in which the drivers 31, 41 may be moved.

Each of the pusher devices 30, 40 comprises an elongated guide device 33, 43 preferably configured substantially parallel to or along the first horizontal direction x. Each guide device 33, 43 comprises a guide 34, 44 that extends along the first horizontal direction x, and, in the embodiment shown, comprises an elongated recess configured parallel to the delivery table 10. In an end region of each guide device 33, 43, the guide 34, 44 makes a transition into a section 35, 45 that extends downward.

The drivers 31, 41, at their lower end, comprise a circular guide element 31c that projects outward, with which the drivers are guided in the guide 34, 44. The drivers 31, 32 are moved by way of a gear mechanism part 37, 47 connected with the drivers, which in turn is coupled with a drive 32, 42 by way of a shaft 36, 37 provided with an outside thread.

If the drivers 31, 41 are moved by the drives 32, 42, the shafts 36, 46, and the gear mechanism parts 37, 47, into the section 35, 45 that extends away from the delivery table 10, the drivers 31, 41 are moved away from the delivery table 10 by the guide elements 31c, 41c. In the embodiment shown in FIG. 3, the drivers 31, 41 are moved "downward," (e.g., the drivers are moved downward out of the transport channel 100). In the elongated region of the guide 34, 44, configured parallel to the delivery table 10, which region is shown for the driver 31 in FIG. 3, at least one section of the driver 31 projects beyond the plane of the delivery table 10 (and thereby into the transport channel 100).

Figure 4:
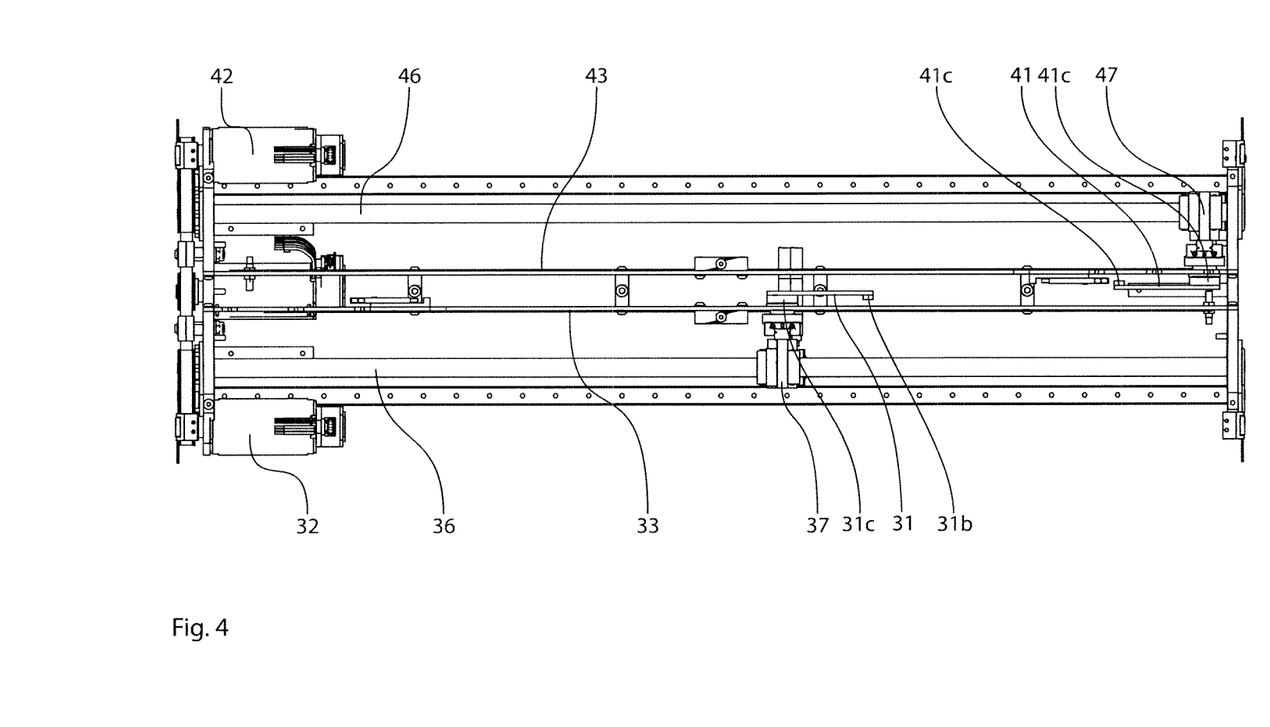
FIG. 4 is a top view of the components of FIG. 3.

FIG. 4 shows a top view of the components of the pusher devices 30, 40 disposed underneath the delivery table 10. As can be seen in this view, the guide devices 33, 43 are disposed parallel to one another, and the drivers 31, 41 are disposed on the guides 34, 44 of the guide device 33, 43 in such a manner that the projections 31*b*, 41*b* of the drivers 31, 41 are disposed opposite one another, so that individual items 50 may be moved in a first direction on the delivery table 10 with driver 31, and individual items 50 may be moved in a second direction on the delivery table 10 with driver 41. For example, the first direction may be to the right and the second direction may be to the left.

Figure 5:
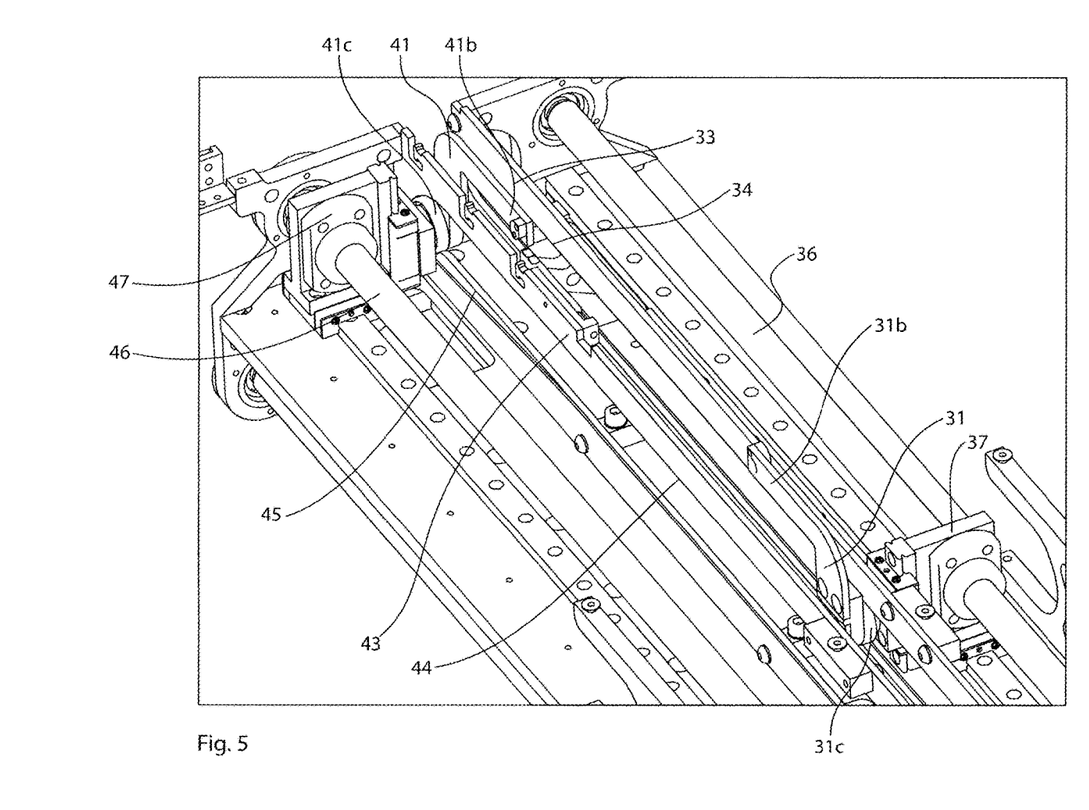
FIG. 5 is a perspective detail view of a section of the components of FIG. 3.

FIG. 5 shows a perspective detail view of a section of the components described with reference to FIG. 3 disposed underneath the delivery table 10. It can particularly be seen in FIG. 5 that the guide device 43 or the guide 44 has a section 45 extending away from the delivery table 10 in an "upper" region. Because the guide device 43 is disposed underneath the delivery table 10 in the embodiment shown, the section 45 extends downward. If the driver 41 is guided, by way of its guide element 41*c*, along the guide 44 into the region that extends downward, the driver 41 is pulled "downward." Therefore the driver 41, which has been dipped into the transport channel 100, is removed from the transport channel 100. The driver 31 is disposed in the elongated part of the guide 34 in the position shown, and therefore dips into the transport channel 100.

Figure 6A:
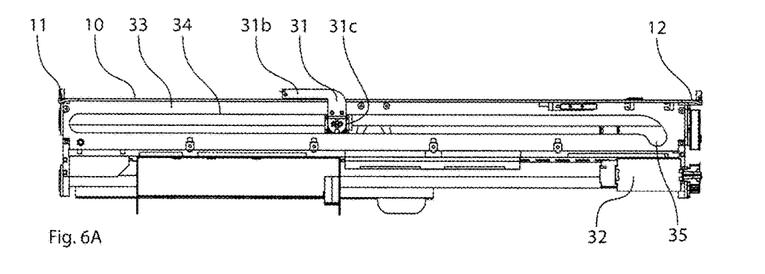
FIG. 6A is a front elevation view of an embodiment of a delivery table, with components disposed underneath, having a position of a driver.
Figure 6B:
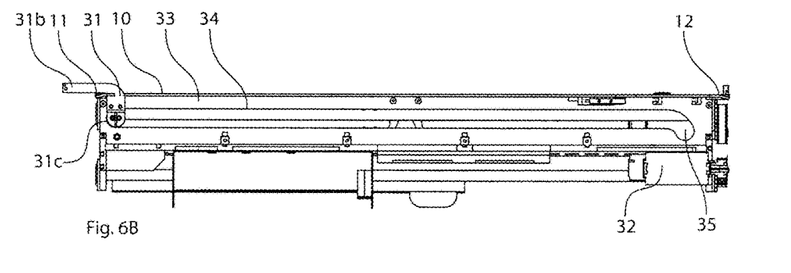
FIG. 6B is a front elevation view of the delivery table of FIG. 6A having another position of the driver.
Figure 6C:
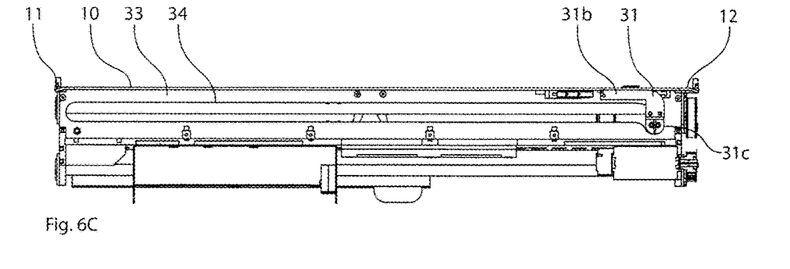
FIG. 6C is a front elevation view of the delivery table of FIG. 6A having another position of the driver.

FIGS. 6A-6C show lateral sectional views of the delivery table 10 and of the components disposed underneath it, with the sectional line placed in such a manner that only the components of the pusher device 30 can be seen. In FIG. 6A, the driver 31 is disposed in the elongated section of the guide 34 of the guide device 33 that is configured parallel to the delivery table 10, and it can be seen that the driver 31 is disposed with the projection 31*b* above the delivery table 10, at least in certain sections, i.e. engages into the transport channel 100.

In FIG. 6B, the driver 31 is disposed in the end region of the guide 34, with this end region lying opposite the section in which the guide 34 extends away from the delivery table 10. In this representation, it can be seen that the projection 31*b* of the driver 31 projects beyond the slotting and picking side 11 of the delivery table 10.

In the representation according to FIG. 6C, the driver 31, together with projection 31*b* and guide 31*c*, has been moved completely into the section 35 of the guide 34 that extends away from the delivery table 10. In the embodiment shown, the section 35 extends downward (in accordance with the placement of the pusher device underneath the delivery table 10), thereby moving the driver 31 downward when it is moved into this section 35 by way of its guide element 31*c*, and therefore out of the transport channel 100.

Figure 7A:
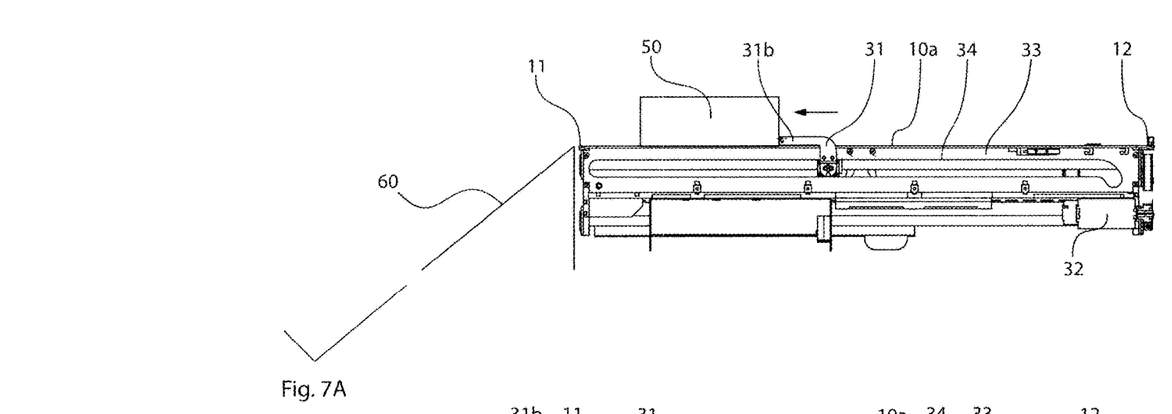
FIG. 7A is a front elevation view of an embodiment of a delivery table, with components disposed underneath, during slotting of an individual item.
Figure 7B:
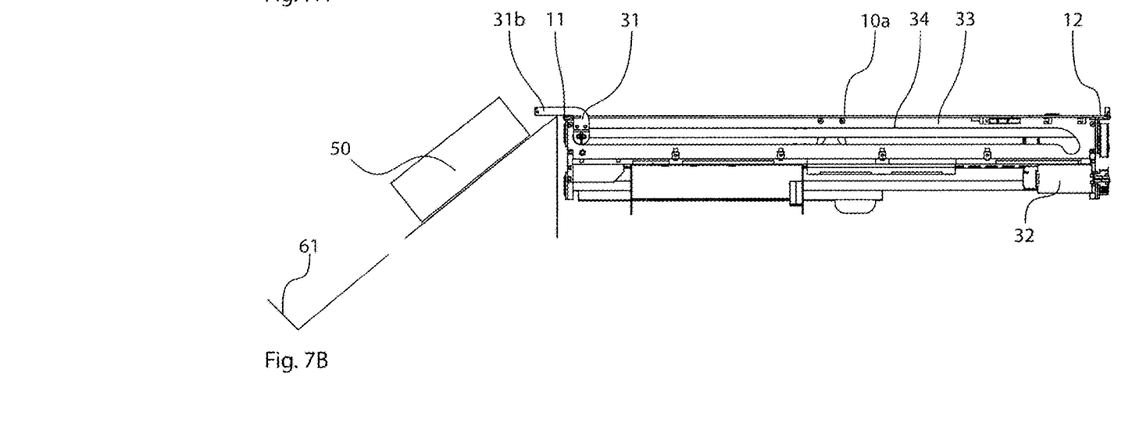
FIG. 7B is a front elevation view of the delivery table of FIG. 7A during further slotting of an individual item.

FIGS. 7A and 7B show lateral sectional views of the delivery table 10 and of the components disposed underneath it, where only the components of the first guide device 33 are shown because of the sectional view. In the representation according to FIG. 7A, an individual item 50 is disposed on the delivery table 10 and in the transport channel 100. The driver 31 moves the individual item 50 on the delivery table 10, which has an adhesion-reducing coating 10*a*, to the left toward the slotting and picking side 11. In the representation according to FIG. 7B, the driver 31 has pushed the individual item 50 beyond the slotting and picking side 11 into the channel 60, in which the individual item 50 will slide until it hits the stop 61.

Figure 8:
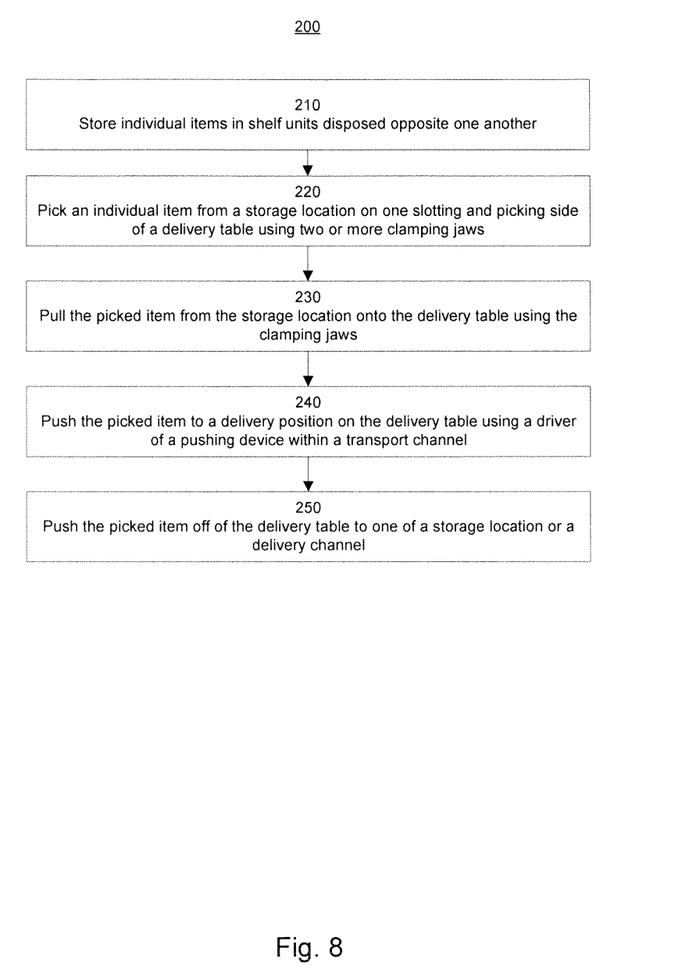
FIG. 8 is a flow chart illustrating steps in a method for picking and slotting individual items from a plurality of storage locations disposed opposite one another, according to some embodiments.

FIG. 8 shows a flow chart illustrating steps in a method 200 for picking and storing individual items (e.g., medication packages), according to some embodiments. Method 200 may be performed in connection with an order-picking apparatus consistent with the present disclosure. Accordingly, the order-picking apparatus in method 200 may include a delivery table (e.g., delivery table 10) having opposite slotting and picking sides (e.g., slotting and picking sides 11, 12) that define a transport channel (e.g., transport channel 100) through which the individual items (e.g., individual items 50) may be moved. The order-picking apparatus in method 200 may also include one or more pusher devices (e.g., pusher device 30, 40) having a driver (e.g., driver 31, 41) with a projection (e.g., 31*b*, 41*b*), a drive component (e.g., U-shaped drive component 23) that carries clamping jaws (e.g., clamping jaws 20*a*, 20*b*). Accordingly, the clamping jaws are configured to grab or pick an individual item from a shelf, move the individual item along the transport channel and push the individual item into a delivery channel.

Steps in method 200 may be performed at least partially by an operator, medical personnel, or a healthcare professional in a healthcare facility or in a drugstore, or in a pharma manufacturing facility. Accordingly, method 200 may be part of a medicament management or a drug logistic prepared by a physician or a healthcare professional. Moreover, method 200 may be performed automatically upon execution of a command provided by or controlled by a healthcare professional. For example, steps in method 200 may be programmed or directed with commands on computer-readable media, which, in some embodiments, can comprise non-transitory computer readable media.

Methods consistent with the present disclosure may include at least one of the steps illustrated in FIG. 8, performed in any order. In some embodiments, a method may include at least two of the steps illustrated in FIG. 8 performed overlapping in time, or even simultaneously. Moreover, embodiments consistent with the present disclosure may include at least one but not all of the steps illustrated in FIG. 8. Furthermore, methods consistent with the present disclosure may include more steps, in addition to at least one of the steps illustrated in FIG. 8. In some embodiments, one or more steps may be repeated.

Step 210 includes storing individual items in shelf units having a plurality of horizontal and/or vertical storage locations disposed opposite another plurality of horizontal and/or vertical storage locations. Step 220 includes picking an individual item from a storage location on one slotting and picking side of a delivery table using two or more clamping jaws. In some embodiments, step 220 includes providing a supporting action when picking individual items from vertical storage locations. Step 230 includes pulling the picked item from the storage location onto the delivery table using the clamping jaws. Step 240 includes pushing the picked item to a delivery position on the delivery table using a driver of a pushing device within a transport channel. In some embodiments, step 240 includes pushing an item that is pulled onto the delivery table from one slotting and picking side to the opposite slotting and picking side, allowing for slotting and picking of items form opposite storage locations without requiring rotation of an operating device about a vertical axis. Step 250 includes pushing the picked item off of the delivery table to another storage location or delivery channel. In some embodiments, step 250 includes using the clamping jaws in as a support structure to prevent the picked item from becoming wedged as it is pushed off of the delivery table.

It is understood that any specific order or hierarchy of blocks in the processes disclosed is an illustration of example approaches. Based upon design or implementation preferences, it is understood that the specific order or hierarchy of blocks in the processes may be rearranged, or that all illustrated blocks be performed. In some implementations, any of the blocks may be performed simultaneously.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. An operating device for an order-picking apparatus having storage locations disposed opposite one another, the operating device comprising:

a delivery table having two opposite slotting and picking sides and two longitudinal sides, wherein a transport channel configured to accommodate at least one individual item extends between the slotting and picking sides along a first horizontal direction, the delivery table further comprising a recess that extends along the first horizontal direction, from which first and second drivers are configured to be at least partially movable into the transport channel, wherein the first and second drivers are further configured to be movable along the first horizontal direction;

two elongated clamping jaws disposed above the delivery table, the elongated clamping jaws having planar clamping surfaces that face one another, wherein the elongated clamping jaws are coupled with a first drive unit and are configured to be movable jointly along the first horizontal direction, wherein the elongated clamping jaws are coupled with a second drive unit and configured to be movable along a second horizontal direction transverse to the first horizontal direction, in one of a direction toward one another and away from one another, so that at least one individual item is configured to be holdable between the clamping surfaces and movable along the first horizontal direction, and wherein the planar clamping surfaces and the slotting and picking sides define boundaries of the transport channel in the first and second horizontal directions; and a first pusher device comprising a first drive for moving a section of the first pusher device along the first horizontal direction, wherein the first pusher device has the first driver coupled with the first drive;

a second pusher device comprising a second drive for moving a section of the second pusher device along the first horizontal direction, wherein the second pusher device has the second driver coupled with the second drive, the first and second drivers configured to be movable past each other within the recess, movable at least partially into the transport channel and removable from the transport channel, and movable in the transport channel, along the first horizontal direction, so that the at least one individual item is movable out of the transport channel by way of one of the slotting and picking sides in at least one or more sections of the transport channel, wherein the operating device is separate and distinct from the storage locations.

2. The operating device of claim 1, wherein the first and second drivers are configured to be separately movable at least partially from the recess into the transport channel.

3. The operating device of claim 1, the first driver comprising a first projection configured to be movable beyond a first one of the slotting and picking sides.

4. The operating device of claim 1, the second driver comprising a second projection configured to be movable beyond a first one of the slotting and picking sides.

5. The operating device of claim 1, the first pusher device comprising a first guide device comprising:

a first guide that extends along the first horizontal direction, the first driver configured to be movable along the first guide through the transport channel; and a first section that extends away from the delivery table at least in one end region, the first section configured so that the first driver is movable out of the transport channel.

6. The operating device of claim 1, the second pusher device comprising a second guide device comprising:

a second guide that extends along the first horizontal direction, the second driver configured to be movable along the second guide through the transport channel; and a second section that extends away from the delivery table at least in one end region, the second section configured so that the second driver is movable out of the transport channel.

7. The operating device of claim 1, wherein the first drive unit and the second drive unit are disposed in a U-shaped drive component spanning the transport channel, the U-shaped drive component configured to be guidable on or underneath the longitudinal sides of the delivery table.

8. The operating device of claim 1, the delivery table further comprising a coating having low adhesion friction in one or more sections of the delivery table.

9. The operating device of claim 1, the clamping jaws further comprising a resilient material in one or more sections of the clamping jaws.

10. The operating device of claim 1, the clamping jaws further comprising clamping surfaces with a coating having adhesion friction in one or more sections of the clamping jaws.

11. An order-picking apparatus, comprising:

a plurality of storage locations disposed opposite one another; and an operating device, the operating device comprising:

a delivery table having two opposite slotting and picking sides and two longitudinal sides, wherein a transport channel for accommodating at least one individual item extends between the slotting and picking sides along a first horizontal direction, the delivery table further comprising a recess that extends along the first horizontal direction, from which a first driver is configured to be at least partially movable into the transport channel, wherein the first driver is further configured to be movable along the first horizontal direction;

two or more clamping jaws disposed above the delivery table, the two or more clamping jaws each having planar clamping surfaces, the clamping surface of one of the two or more clamping jaws configured to face the clamping surface of another one of the two or more clamping jaws, wherein the two or more clamping jaws are coupled with a first drive unit and are configured to be movable jointly along the first horizontal direction, wherein the two or more clamping jaws are coupled with at least one second drive unit and configured to be movable along a second horizontal direction transverse to the first horizontal direction, wherein the clamping surfaces are configured to hold and move at least one individual item in the first horizontal direction for guidance along the planar clamping surfaces from one opposite slotting and picking side to the opposite slotting and picking side, and wherein the clamping surfaces and the slotting and picking sides define boundaries of the transport channel in the first and second horizontal directions; and at least one pusher device comprising a first drive for moving a section of the pusher device along the first horizontal direction, wherein the pusher device has the first driver coupled with the first drive, the first driver configured to be movable at least partially into the transport channel and at least partially out of the transport channel, and wherein the first driver is configured to be movable along the first horizontal direction in the transport channel, wherein movement of the first driver is confined between the slotting and picking sides, wherein in at least one or more sections of the transport channel is configured so that the at least one individual item is movable out of the transport channel by way of one of the slotting and picking sides, wherein the operating device is separate and distinct from the plurality of storage locations.

12. The order-picking apparatus of claim 11, the operating device further comprising a second pusher device having a second drive and a second driver, wherein the first and second drivers are configured to be separately movable at least partially from the recess into the transport channel, wherein the first and second drivers are configured to be movable in the transport channel along the first horizontal direction.

13. The order-picking apparatus of claim 12, the first and second drivers each comprising a projection configured to be movable beyond a first one of the slotting and picking sides.

14. The order-picking apparatus of claim 12, each pusher device comprising a guide device, the guide device comprising:
    a guide that extends along the first horizontal direction, wherein one of the first and second drivers is configured to be movable along the guide through the transport channel; and
    a section that extends away from the delivery table at least in one end region, the section configured so that the one of the first and second drivers is movable out of the transport channel.

15. The order-picking apparatus of claim 11, wherein the first and second drive units are disposed in a U-shaped drive component spanning the transport channel, the U-shaped drive component configured to be guidable on or underneath the longitudinal sides of the delivery table.

16. The order-picking apparatus of claim 15, wherein one of the two or more clamping jaws are disposed on one side of the U-shaped drive component closer to one slotting and picking side, and wherein another one of the two or more clamping jaws are disposed on another side of the U-shaped drive component closer to the opposite slotting and picking side.

17. The order-picking apparatus of claim 11, wherein the delivery table comprises a coating having low adhesion friction in one or more sections of the delivery table.

18. The order-picking apparatus of claim 11, wherein the clamping jaws comprise at least one of a resilient material and a surface coating having adhesion friction in one or more sections of the clamping jaws.

19. A method for picking and slotting individual items from a plurality of storage locations disposed opposite one another, the method comprising:
    providing the order-picking apparatus of claim 11;
    storing individual items in shelf units having the plurality of storage locations disposed opposite one another;
    picking, by the two or more clamping jaws, an individual item from a first storage location on one slotting and picking side of a delivery table;
    pulling, by the clamping jaws, the picked item from the first storage location onto the delivery table;
    pushing, by the first driver of the pusher device within the transport channel, the picked item to a delivery position on the delivery table; and
    pushing, by the first driver of the pusher device within the transport channel, the picked item off of the delivery table to one of a second storage location or a delivery channel.

* * * * *